US007577587B2

(12) United States Patent
Gee

(10) Patent No.: US 7,577,587 B2
(45) Date of Patent: Aug. 18, 2009

(54) PURCHASE ORDER AND PURCHASE ORDER RESPONSE INTERACTIVE FORMS

(75) Inventor: Karen A. Gee, Heidelberg (DE)

(73) Assignee: SAP AG, Walldorf (DE)

( * ) Notice: Subject to any disclaimer, the term of this patent is extended or adjusted under 35 U.S.C. 154(b) by 496 days.

(21) Appl. No.: 10/949,110

(22) Filed: Sep. 24, 2004

(65) Prior Publication Data

US 2006/0010054 A1 Jan. 12, 2006

(51) Int. Cl.
*G06Q 30/00* (2006.01)
(52) U.S. Cl. .......................................................... 705/26
(58) Field of Classification Search .................. 705/26, 705/27
See application file for complete search history.

(56) References Cited

U.S. PATENT DOCUMENTS

| | | | | |
|---|---|---|---|---|
| 5,675,780 | A * | 10/1997 | Plant-Mason et al. | 707/6 |
| 5,758,327 | A * | 5/1998 | Gardner et al. | 705/26 |
| 6,104,999 | A * | 8/2000 | Gilles et al. | 705/1 |
| 6,249,844 | B1 * | 6/2001 | Schloss et al. | 711/122 |
| 6,850,900 | B1 * | 2/2005 | Hare et al. | 705/26 |
| 2002/0169710 | A1 * | 11/2002 | Morimoto | 705/37 |
| 2005/0102192 | A1 * | 5/2005 | Gerrits et al. | 705/26 |
| 2006/0036507 | A1 * | 2/2006 | Pujar et al. | 705/26 |
| 2006/0116936 | A1 * | 6/2006 | Lucas | 705/28 |
| 2007/0162326 | A1 * | 7/2007 | Weel et al. | 705/10 |

OTHER PUBLICATIONS

Federal Information and News Dispatch, "Request for information (RFI), EPAAMS", Commerce Business Daily, Washington; May 30, 2001, p. 1 http://proquest.umi.com/pqdweb?did=73397006&sid=3&Fmt=3&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—Kenyon & Kenyon LLP

(57) ABSTRACT

The present invention provides a method and system for generating electronic purchase orders and purchase order responses. Purchase orders and purchase order responses may be automatically filled in using business data stored by the purchaser. The system may automatically generate one or more messages and attach the purchase order and/or purchase order response to transmit these forms to a supplier. The supplier may accept all of the terms of the purchase order or submit changes in the purchase order response. After completing the response, the sender may attach it another message and transmit it. The purchaser may review the purchase order response and may automatically download it into a purchasing system. This system allows a supplier to work off-line without losing any benefits of on-line access. For example, the supplier's input is filtered as it would be if the supplier was working on-line. Also, the supplier's information can be uploaded automatically into the purchaser's system.

31 Claims, 5 Drawing Sheets

Emulation of an Online Purchase Order Environment
100

Purchase Order/
Purchase Order Response

Offline Supplier Systems

Accepted/Modified
Purchase Order Response

Purchase Order
103

| Position | Material/Item | Quantity | UOM | Price | Delivery Date |
|---|---|---|---|---|---|
| 1 | Pipe Fittings | 80 | xxx | xxxx.xx | 10.10.2004 |
| 2 | Joins | 50 | xxx | xxxx.xx | 10.10.2004 |
| 3 | Sealant | 10 | xxx | xxxx.xx | 10.10.2004 |

Total: xxxxxx.xx

- Company Information (Purchaser) — 309
- Company Information (Supplier) — 311
- General Order Information — 313

315 Position  317 Material/Item  319 Quantity  323 UOM  325 Price  327 Delivery Date

Fig. 3b

PURCHASE ORDER AND PURCHASE ORDER RESPONSE INTERACTIVE FORMS

BACKGROUND

Companies that engage in commercial transactions often communicate to each other using various forms to negotiate terms of their transactions. For example, purchasers who wish to purchase an item may send a purchase order to a supplier. The purchase order may set forth the number of items that are requested, the price, and a requested delivery date. The supplier may respond with a confirmation or with an alternate proposal setting forth items that can be delivered, a price and dates that the supplier is able to deliver these items.

These exchanges may be using paper forms that are sent via facsimile (FAX). Electronic Data Interchange (EDI) may also be used to communicate business transactions, such as orders, confirmations and invoices, between organizations electronically. Extensible Markup Language (XML) has been a primary vehicle used to connect businesses together using the World Wide Web (WWW) as the communications vehicle. XML is used for defining data elements on a Web page and business-to-business documents.

However, current methods of transmitting these forms are prone to many problems that may incur unnecessary costs and cause poor performance in the delivery of the desired items. Suppliers who receive purchase order forms may not be connected to a purchaser's system and may not want to work on-line. Thus, forms may be manually completed requiring that information received in these forms be manually entered into a database. This is a lengthy process that is prone to errors. Additionally, suppliers may include errors in their responses to purchase orders or else suppliers may fail to adequately respond leading to further delays and inaccuracies. Further, printouts of electronic data may not be in a user-friendly format that is similar to a paper purchase order. Manual intervention may be required to obtain a usable printout. The problems with current systems become more severe for purchasers and suppliers who send and receive many such forms to conduct their business. Purchasers and suppliers would benefit from leveraging communication tools such as electronic mail (e-mail) to send forms to users who want to work off-line without losing benefits of working on-line such as filtering data that is input into the form and having access to data by on-line systems.

BRIEF DESCRIPTION OF THE DRAWINGS

FIG. 3b illustrates a purchase order according to one embodiment of the invention.

DETAILED DESCRIPTION

The present invention provides a method and system for emulating an on-line purchase order environment. On-line emulation may be initiated by generating one or more documents that comprise a purchase order and purchase order response. Purchase orders and purchase order responses may contain duplicate data and be automatically filled in using business data stored by an on-line system maintained by a purchaser. An order confirmation may also be sent. The purchaser may then transfer these forms to a transportable electronic medium, such as an attachment to an electronic mail message (e-mail), and send them to a supplier. A supplier may review these forms by simply clicking on the forms in the e-mail. The supplier or buyer does not need to navigate and click through the purchaser's system to use the form. The purchase order response may include dynamic fields that allow the supplier to accept all of the terms or submit changes in the purchase order response. The supplier's changes may be automatically checked by controls within the form to reduce errors in preparing the response in much the same way as would be provided with on-line access. After completing the response and/or the order confirmation, the sender may attach it to another message and transmit it. The purchaser may review the purchase order response and may automatically upload the information it contains into the purchaser's on-line system. This allows a supplier to work off-line without losing any benefits of on-line access. The purchaser and supplier may retain a copy of the same purchase order, which is a static, read-only form that cannot be modified, as a record of the purchaser's request. In an alternate embodiment of the invention, the supplier can send a second response to the purchase order, using the same form. Thus, a supplier can provide responses back to the purchaser in a phased approach when the supplier can confirm that the purchaser's requirements may be met or can change a previous response indicating that the supplier can no longer meet the purchaser's requirements.

Figure 1:
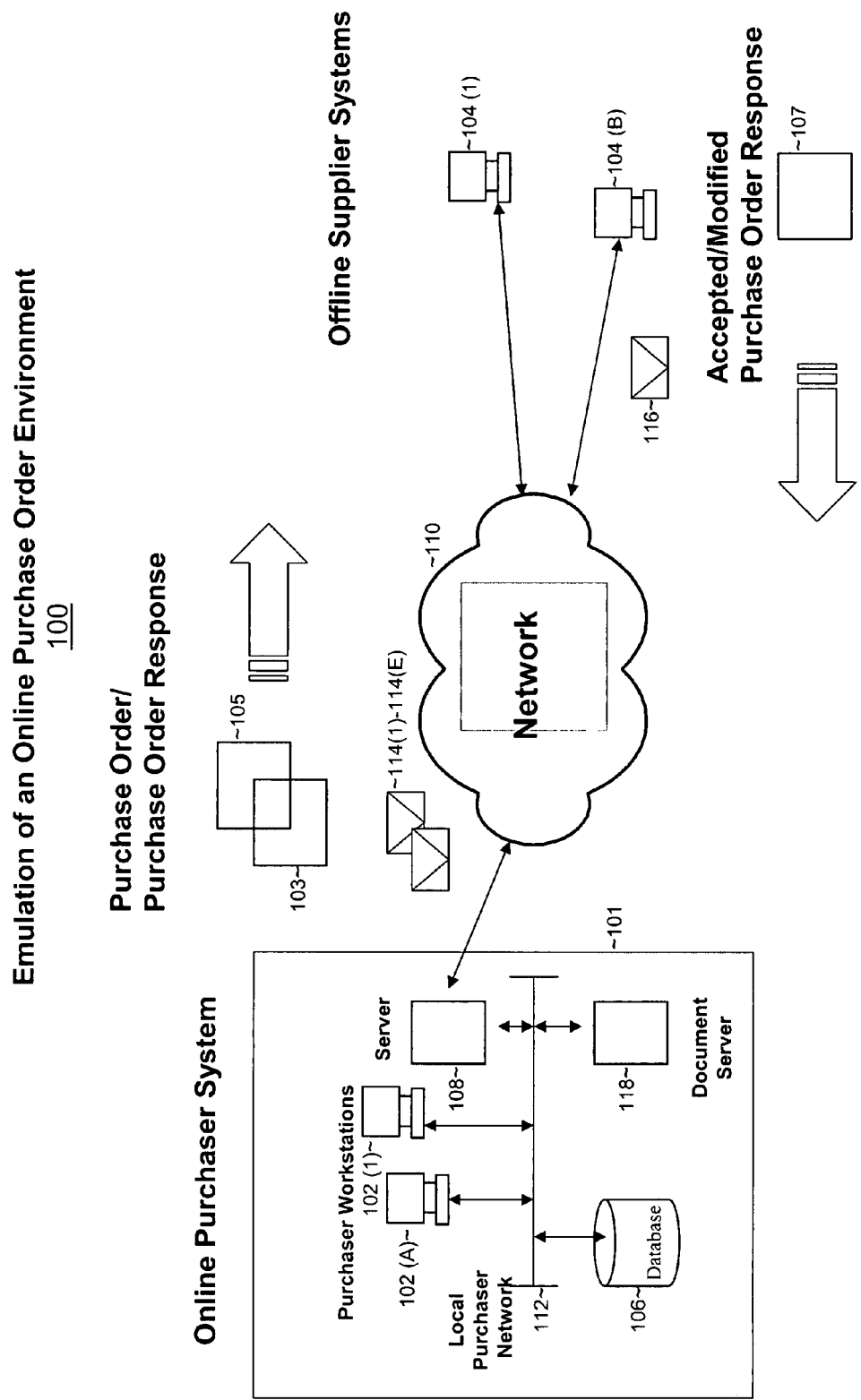
FIG. 1 illustrates an emulation of an on-line purchase order environment according to one embodiment of the invention.

FIG. 1 illustrates a purchase order environment 100 according to one embodiment of the invention. On-line purchaser system (or purchaser system) 101 may be used to provide emulation of on-line purchase order processing to off-line supplier systems 104(1)-104(B). On-line emulation may be initiated by purchaser system 101 to off-line supplier systems 104(1)-104(B) by generating for each supplier a purchase order 103 and purchase order response 105. Purchase order 103 and purchase order response 105 may be sent to a supplier as one or more attachments to e-mails 114(1)-114(E). In one embodiment of the invention, purchase order 103 and purchase order response 105 may be a single electronic document that is transmitted via the same e-mail 114. In an alternate embodiment of the invention, purchase order 103 and purchase order response 105 may each be an electronic document and sent via the same email 114 or purchase order response 105 may be sent in a subsequent e-mail, which follows shortly after acknowledgement of receipt of purchase order 103.

In another alternate embodiment of the invention, an order confirmation is sent. The order confirmation may be sent as a third portion of an attachment of email 114, as a separate attachment of any of emails 114(1)-114(E) or instead of purchase order response 105. Order confirmation may be the same as purchase order response 105 except for a variation in the fields included.

Purchase order system 101 is connected to network 110, which may be, for example, the Internet or World Wide Web, to transmit e-mails 114(1)-114(E). Network 110 is also connected to supplier workstations 104(1)-104(B), via for example, supplier mail servers, so that e-mails 114(1)-114(E) may be received by supplier workstations 104(1)-104(B).

Supplier workstation 104 may be any processing device including a personal computer, laptop computer, personal data assistant or telephone that can be used as a computer system by a supplier. In an alternate embodiment of the invention, the supplier's computer system comprises supplier workstation 104 that is connected via, for example, a local area network or wide area network, to other components of a supplier computer network. Supplier workstation 104 receives e-mail 114 while connected to purchaser system 101 via network 110. A supplier may connect and disconnect supplier workstation 104 from network 110. While supplier workstation 104 is connected to network 110, supplier workstation 104 operates in an on-line mode and may communicate directly with any system connected to network 110, such as purchaser system 101. While supplier workstation 104 is not connected to network 110, supplier workstation 104 operates in an off-line mode and cannot communicate with, for example, purchaser system 101. In an alternate embodiment of the invention, supplier workstation 104 operates in off-line mode and receives purchase order 103 and purchase order response 105 via a transportable electronic medium that does not require connection to network 110. Exemplary transportable electronic mediums that do not require connection to network 110 are digital video disk or digital versatile disks (DVDs) and/or compact disk read only memories (CD-ROMs) that may be sent via delivery service or U.S. mail.

While operating in off-line mode, supplier workstation 104 may display purchase order 103 and purchase order response 105, and query the supplier for changes to purchase order response 105. The supplier may review purchase order response 105 and modify contents in accordance with what the supplier can accommodate, or accept all of the purchaser's terms, and save this input in a responsive purchase order response 107 (also referred to as accepted/modified purchase order response 107). The supplier can then attach responsive purchase order response 107 to another e-mail 116, connect to network 110 and send responsive purchase order response back to the purchaser. The responsive purchase order response 107 can then be uploaded back into the online purchaser system 101.

In one embodiment of the invention, purchaser system 101 may comprise purchaser workstations 102(1)-102(A) that are connected to database 106, server 108 and document server 118 via local purchaser network 112. Purchaser workstation 102 may be used by a purchaser to generate and send purchase order 103 and purchase order response 105 and the order confirmation. These documents may be generated by e.g., server 108 using internal work requests stored by server 108 or database 106. Purchaser system 101 may run a supplier relationship software application, such as mySAP SRM on, for example, server 108. Supplier relationship management software may provide automated visibility into supplier relationship processes such as order fulfillment, distribution and management, collaborative product design, and supply management. Emulation of on-line purchase order processing may be used to increase automation for purchasers by automatically uploading data received in responsive purchase order responses 107 and/or the responsive order confirmation into server 108 or database 106 so that it is it can be used by the supplier relationship management processes.

Server 108 may be any device that can provide supplier relationship management functionality by processing instructions written in, for example, an object-oriented programming language such as Java or C++. Server 108 may also be used to transmit e-mails 114 (1)-114(E) and receive e-mails 116(1)-116(F) from the supplier. In an alternate embodiment of the invention, another server is used to transmit e-mails 114(1)-114(E) and receive e-mails 116(1)-116(F). Server 108 may be connected to database 106, which may be any set of data stored in a file format on any machine readable medium, to store and retrieve data. For example, purchase orders 103(1)-103(D) and purchase order responses 105(1)-105(F) may be stored in database 106.

Document server 118 may be used to translate purchase orders 103(1)-103(D) and purchase order responses 105(1)-105(F) into a transferable electronic format such as Adobe portable document format (pdf) or Microsoft Smartdocuments. This allows purchase order 103 and purchase order response 105 to be attached to e-mails 114(1)-114(E).

In an alternate embodiment of the invention, the functions performed by server 108, document server 118 and/or database 106 reside in each of purchaser workstations 102(1)-102(A) and server 108, document server 118 and/or database 106 are not used.

Figure 2:
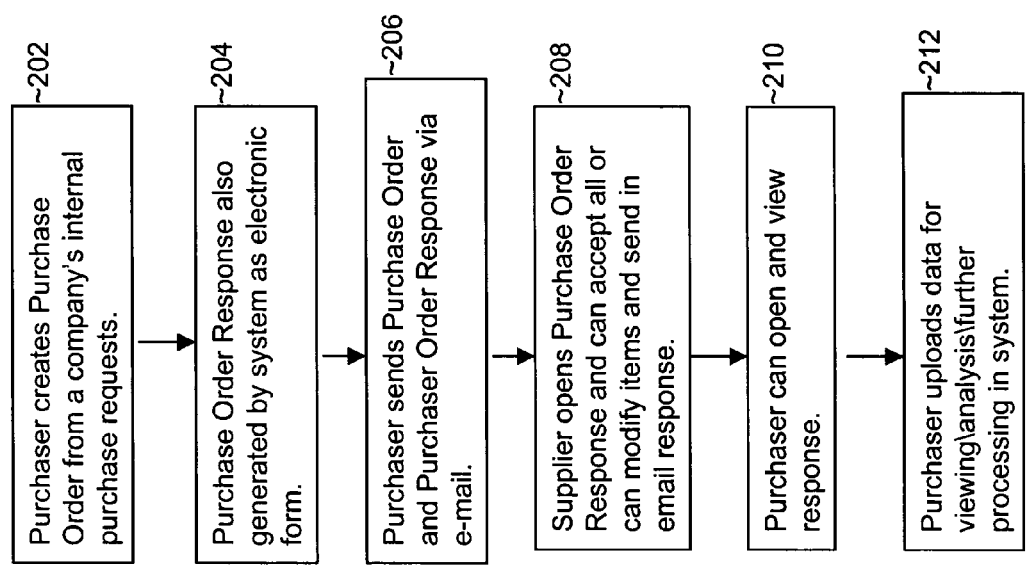
FIG. 2 illustrates the operation performed to process purchase orders according to one embodiment of the invention.

FIG. 2 illustrates the operation performed to process purchase order 103 according to one embodiment of the invention. This operation may be used to provide a fully automated, user-friendly approach between the purchaser and the supplier for processing purchase order 103.

In step 202, server 108 creates purchase order 103 from a company's internal purchase requests. One or more groups within a company may have a need to purchase certain items and may submit an internal purchase request. To purchase items to satisfy the request, a user can initiate generation of purchase order 103, which is an electronic form representing an order for a purchase. In an alternate embodiment of the invention, purchaser workstation 102 may generate purchase order 103.

To initiate the process, the user may select, using purchaser workstation 102, one or more internal requests in response to a query generated from server 108. Upon receipt of the selection, the user is queried as to whether the user wishes to generate purchase order 103. Because a user may generate purchase order 103 in response to multiple internal requests, purchase order 103 may represent the aggregated demand of requests from one or more groups within the company. If the user chooses to proceed, purchase order 103 can be generated automatically by, for example, server 108, using data retrieved from storage in a back office system, such as database 106.

The data stored in database 106 may include data that was submitted in the internal purchase requests, such as the number of items that are desired and when they are needed. Additionally, supplier data may be stored in a database, such as database 106, which can be automatically retrieved and downloaded into the electronic forms. Exemplary supplier data includes a name of a supplier or vendor, the items that they typically offer, the street address and e-mail of the supplier, and the prices of the items. A user may also specify a requested supplier in an internal purchase request, which will then be electronically downloaded into purchase order 103. Purchase order 103 will also be filled with pre-formatted, pre-defined message text including, for example, terms of the purchase order agreement and other contractual text.

Figure 3A:
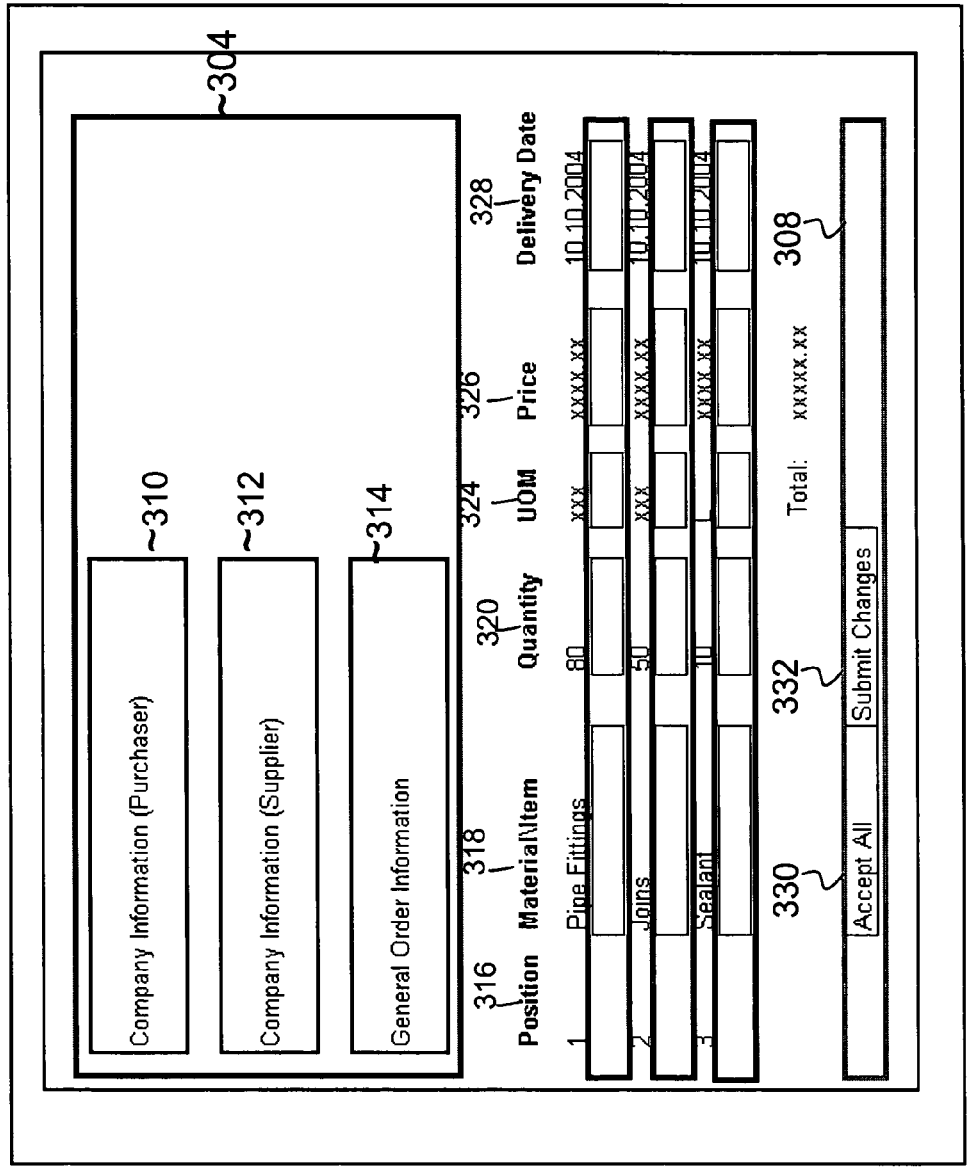
FIG. 3a illustrates a purchase order response according to one embodiment of the invention.

Transfer of information from server 108, operating in, for example, an object-oriented environment such as Java, to a transferable electronic document format, such as Adobe pdf, may occur by using guided procedures. Guided procedures may be used to call document server 118 to convert documents into the transferable electronic document format. Document server 118 stores a template for each form generated. A template describes document structure, appearance, and content from a back office system that will appear in the generated document. FIGS. 3a and 3b provide illustrations of templates for purchase order response 105 and purchase order 103. Data is transferred from database 106 to document server 118 to be used to populate the form. An XML schema may be used to provide a structural definition of the document that will act as a template for populating the document and for retrieving data from the document and uploading it in purchaser system 101. Fields may be identified by tags that define the data that should be populated in a particular field. Tags may also be used to define the format of the data populated in the field, e.g., the font of the display. Document server 118 may recognize the form elements based on the XML schema that may be defined by the purchaser. Document server 118 may also populate fields of a template by identifying data by, for example, using sequence numbers to identify data elements, so that it can recognize the appropriate data element to populate in a particular field.

In step 204, server 108 or purchaser workstation 102 automatically generates purchase order response 105. Purchase order response 105 may be automatically generated at the same time as purchase order 103. Purchase order 103 and purchase order response 105 may be generated as two portions of a single document or may be generated as two separate documents. Purchaser workstation 102 may generate purchase order response 105 using data contained within purchase order 103. Purchase order response 105 may contain dynamic fields that may be modified by a supplier. Purchase order 103, on the other hand, may be stored in read-only format so that it remains unmodified to store a record of the initial purchase request.

In an alternate embodiment of the invention, an order confirmation is generated. The order confirmation may be generated instead of purchase order response 105 or in addition to purchase order response 105. The order confirmation may be part of a document also including purchase order 103 and/or purchase order response 105, or may be in a separate document. The order confirmation may also have dynamic fields that can be modified by a supplier.

In step 206, a purchaser sends purchase order 103 and purchase order response 105 and/or the order confirmation using a transportable machine-readable medium, such as one or more files that are attached to e-mail 114. In an alternate embodiment of the invention, purchase order response 105 may be attached to e-mail 114(2) and sent shortly after receipt by supplier of purchase order 103. The order confirmation may be attached to a third e-mail 114(3) to be sent shortly after receipt of purchase order response 105. The user may also manually attach the forms using an attachment feature provided by an e-mail service, such as Microsoft Outlook. In an alternate embodiment of the invention, the electronic documents are transmitted to the supplier via another transportable machine-readable medium such as a storing documents on a DVD and/or CD-ROM and mailing them so that the supplier can load them onto the supplier's computer system. Additionally, the form may be printed and FAXed or mailed.

In step 208, upon receipt, a supplier opens purchase order response 105 and/or the order confirmation and is queried to accept or modify the items. Purchase order response 105 and the order confirmation provide controls and other visual elements, which enable the form recipient to input their responsive information. The supplier's input may be filtered using electronic controls within the form although the supplier is not operating on-line. A supplier may navigate purchase order response 105 and order confirmation without having to navigate through screens displayed by purchase system 101. The supplier can also optionally save purchase order response 105 electronically either before or after the supplier completes the form, which may be useful for archiving or record retention purposes. The supplier may save the form in its entirety, as a pdf, Smart Document, or other electronic document. In an alternate embodiment, a control is provided in the form itself, or in a device used to read the form. Such controls may be provided in various electronic formats, e.g., Acrobat reader, or 2003 or higher versions of Office Infopath and\or Smart-documents. A control may be used to enable the supplier to save all transactional data as XML, or in tab\comma\space delimited form. The supplier may also print the form. The supplier may attach the forms using an e-mail service attachment feature and return the completed purchase order response to the purchaser. The supplier may also use any other transportable machine-readable medium. Once the supplier has submitted changes or accepted all conditions set forth by the purchaser, the purchase order response 105 may be stored as a static response purchase order response 107 so that no fields can be further modified. The order confirmation may be stored as a responsive order confirmation. According to one embodiment of the invention, a supplier may maintain purchase order response 105 and/or order confirmation so that the supplier can again respond to purchase order 103. In an alternate embodiment of the invention, once the supplier responds to purchase order 103, the supplier cannot provide a supplemental response. In this alternate embodiment of the invention, purchase order response 105 and/or the order confirmation may be automatically deleted upon creation of a corresponding responsive document by, for example, saving over purchase order response 105 and/or the order confirmation.

In step 210, upon receipt, the purchaser can open and view responsive purchase order response 105 and/or the responsive order confirmation.

In step 212, the purchaser can use controls provided in purchase order response 105 and/or the order confirmation to transmit the supplier's responsive data into the purchaser system 101 so that it can be stored by, for example, database 106. Guided procedures may be used to call document server 118 so that it can retrieve data from the purchase order response 105 and/or the order confirmation and store it in corresponding fields of said database 106. In an alternate embodiment of the invention, a program written in Java programming code, ABAP code, or other programming language is used to monitor an HTTP server or email box. Upon receipt of the email containing the attached response document, the program would manage the extraction of data from the form, and the submission of this data to the correct business objects in the backoffice. A database may be maintained within purchaser system 101, e.g., within server 108 or database 106 that includes entries for a supplier's modifications to purchase order response 105 and/or the order confirmation. These entries may include supplier-provided material/item, quantity, UOM, price, delivery date, tracking data and/or supplier order number. Server 108 may identify an entry, e.g., supplier-provided material/item corresponding to a data element retrieved from responsive purchase order response 107 and/or the responsive order confirmation received from a supplier. Data may be stored by, for example, server 108 or application database 106. Storing this data in purchaser system 101 allows it to be used for further analysis and decision-making by, for example, a supplier relationship management software application. Users of purchaser system 101 may review response data, and find another supplier to provide the item, or they can electronically notify the person who placed the original order with information from the response. Additionally, statistics may be collected based on responses to analyze a supplier's ability to fulfill the company's needs.

FIG. 3a illustrates a purchase order response 105 according to one embodiment of the invention. Purchase order response 105 comprises a static field 304 including, for example, identification information that cannot be changed by the supplier. Identification information may include purchaser company information 310, supplier company information 312, and general order information 314. General order information 314 may include for example an order number.

Purchase order response 105 includes supplier inputs. Exemplary supplier inputs include material/item field 318, quantity field 320, Unit of Measure (UOM) field 324, price field 326 and delivery date field 328. Position 316 is a reference indicator for the form. Material/item field 318 is a field that may contain a brief description of the materials or items that are to be purchased. Quantity field 320 is a field that may contain the quantity of those materials or items. UOM 324 is field that may contain a unit of measure of materials ordered. Price 326 is field that may contain the price of the materials or items, and delivery date field 328 is a field that may contain the date that the material or items will be delivered by the supplier to the purchaser. Purchase order response 105 may also have other fields for supplier generated information such as a tracking data field for tracking reference numbers used by the supplier or a shipping company to track items and a supplier internal order identifier.

In an alternate embodiment of the invention, an order confirmation is generated instead of or in addition to purchase order response 105. An order confirmation is the same as purchase order response 105 except for a variation in fields. Use of a purchase order response 105 and an order confirmation allows a purchaser to provide a supplier with two different forms for two different purposes. For example, a purchase order response 105 may be used to negotiate terms of a purchase order agreement and an order confirmation may be used to confirm the order. The order confirmation may not include a price field. In addition, purchase order response 105 may be transmitted without fields for supplier generated information such as a tracking data field and a supplier internal order identifier, and these fields may be included only in the order confirmation.

Purchase order response 105 and the order confirmation provide filters, formatting and validation. The template for purchase order response 105 and the order confirmation can be defined using form elements from either Adobe or Microsoft, and using programmatic languages such as Javascript, or published languages from Adobe or Microsoft, so that each user interface element in the form can perform logical operations on the input, based on the user input. An example of pre-defined behavior which will be delivered in the form template is formatting. Such defined functionality will add appropriate punctuation, symbols, and literals to items entered as, for example, currency.

Purchase order response 105 and the order confirmation may also include a toolbar 308 that allows a supplier to select an accept all button 330, which may be used to notify a purchaser that the supplier accepts all terms of purchase order 103. Toolbar 308 may also include a submit changes button 332, which may be used to submit changes that the supplier entered into purchase order response 105. By selecting either accept all button 330 or submit changes button 332, the supplier creates responsive purchase order response 107. When the supplier selects either accept all button 330 or submit changes button 332, the information provided by the supplier in purchase order response 105 or the order confirmation is stored in responsive purchase order response 107 or the responsive order confirmation and is memorialized for future transactions between the purchaser and the supplier.

FIG. 3b illustrates a purchase order 103 according to one embodiment of the invention. Purchase order 103 may be entirely static and not modifiable a supplier so that it can be used for record-keeping purposes. Purchase order 103 comprises purchaser company information (PO) field 309, supplier company information static (PO) field 311, and general order information (PO) field 314. This information is the same as that included in Purchase Order Response 105.

Purchase order response 103 includes purchaser inputs, such as material/item (PO) field 317, quantity (PO) field 319, Unit of Measure (UOM) (PO) field 323, price (PO) field 325 and delivery date (PO) field 327. Position 315 is used as a reference indicator for the form. These fields include the same type of information as was described with respect to purchase order response 105. However, the purchaser system 101 or a user of purchaser system 101 submits the data. Purchase order 103 is a static record providing the original request submitted by the purchaser. Purchase order response 103 also has filters, formatting and validation. Purchase order 103 does not have either an accept all button or a submit changes button.

Purchase order 103, purchase order response 105, and the order confirmation may be printed. This allows identical forms to be used with various mediums e.g., e-mail attachment, FAX, print-out. Additionally, purchase order 103, purchase order response 105, and the order confirmation may have a layout of controls and items that provide for user-friendly printing. For example, page breaks may be efficiently set, breaks between sections may be in appropriate places so that printing will be on an optimized number of paper sheets and not, for example, cut off text, print without headers on each page, or print without identification information on each page. The user can specify the look of the form in both electronic and print formats with the same flexibility as, for example, creating a design on a blank sheet of paper. Software tools in Adobe or Microsoft can be used to alter the template so that the document to provide a customized look for the customer. The user is not tied to any particular file layout and is not tied to automatic page breaks that do not provide a user-friendly appearance.

Figure 4:
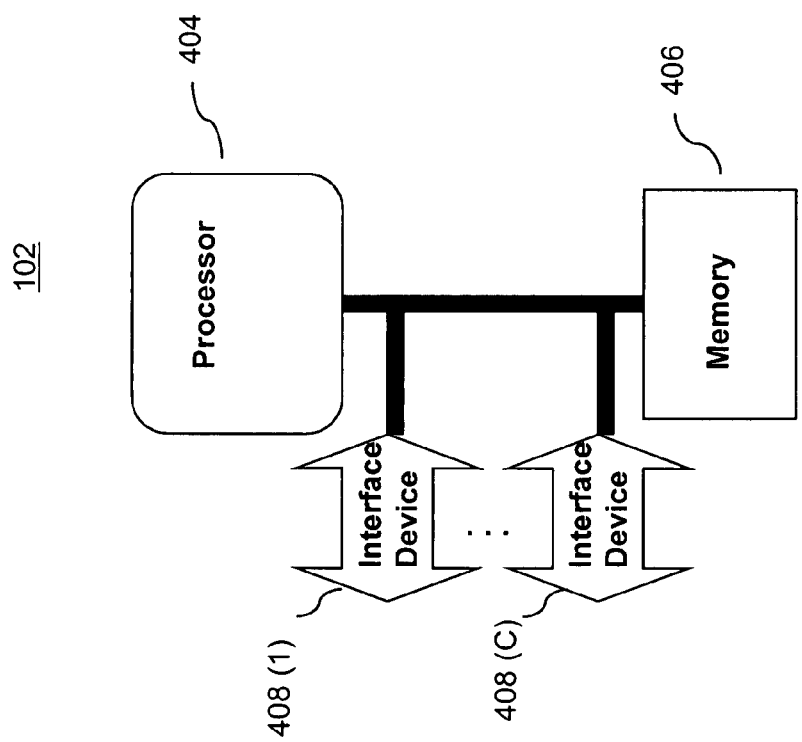
FIG. 4 depicts a structure of purchaser workstation according to one embodiment of the invention.

FIG. 4 depicts a structure of server 108 according to one embodiment of the invention. Server 108 includes processor 404, memory 406, and interface devices 408 (1)-408 (C). Processor 404 is connected to memory 404. Processor 404 is also connected to interface devices 408 (1)-408(C). These connections are direct or via other internal electronic circuitry or components. Software used to generate and store on transportable machine-readable medium purchase order, purchase order response and the order confirmation, receive uploaded information from responsive purchase order response 107 and the responsive order confirmation and/or store this data so that it can be used to provide supplier relationship management functionality may reside on memory 406 and be processed by processor 404.

Processor 404 may be any programmable processor that executes instructions residing in memory 406 to receive and send data via interface devices 408(1)-408(C). A programmable processor may be any programmable microprocessor or combination of microprocessors or processors that can operate on digital data, which may be special or general purpose processors coupled to receive data and instructions from, and to transmit data and instructions to, a machine-readable medium. According to one embodiment of the present invention processor 406 is an Intel microprocessor.

Memory 406 may be any machine-readable medium that stores data that is processed by processor 404. Machine-readable medium may be any device that stores digital data including any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 404 via one or more interface devices 408(1)-408 (A).

Interface devices 408 (1)-408 (A) are interfaces that receive and/or send digital data to and from an external device. Interfaces as used herein are any point of access to an external device where digital data is received or sent, including ports, buffers, queues, subsets thereof, or any other interface to an external device.

Server 108 may operate with purchaser workstation 102 to provide a user interface. Purchaser workstation 102 may be any device having a graphical user interface (GUI), including a personal computer, a phone, or a personal data assistant that is connected via one or more interface devices 408(1)-408 (A). Such devices may comprise an output device that can provide to a user any form of sensory feedback such as voice, auditory or tactile (e.g., liquid crystal display (LCD), cathode ray tube (CRT), or earpiece) and an input device providing any form of input to the computer including acoustic, speech, or tactile input (e.g., keyboard, mouse, trackball, keypad).

Various implementations of the systems and techniques described here can be realized in any processing systems and/or digital electronic circuitry, integrated circuitry, specially designed ASICs (application specific integrated circuits), computer hardware, firmware, software, and/or combinations thereof. For example, some features of the system may be implemented in computer programs executing on programmable computers. Each program may be implemented in a high level procedural or object-oriented programming language to communicate with a computer system or other machine. Furthermore, each computer program may be stored on a storage medium such as read-only-memory readable by a general or special purpose programmable computer or processor, for configuring and operating the computer to perform the functions described above.

A number of embodiments of the invention have been described. Nevertheless, it will be understood that various modifications may be made.

What is claimed is:

1. A computer-implemented method, comprising:
    generating, by software installed on a server within a purchaser's system, an electronic document comprising a purchase order, a separate purchase order response and an order confirmation, the purchase order including a first plurality of fields having read-only values, the purchase order response including a second plurality of fields that are dynamic fields having editable values and the order confirmation including a third plurality of fields that are dynamic fields having editable values, wherein the first, second and third plurality of fields each represent a plurality of terms of sale, wherein said dynamic fields comprise rules for comparing data input to permissible values for the terms of sale;
    sending said electronic document from said purchaser's system to a supplier system; and
    responsive to receipt of a modified copy of said purchase order response from said supplier system, integrating contents of said modified copy with said software installed on said purchaser's system.

2. The method of claim 1, wherein said purchase order response portion provides filtering to notify said supplier of errors during alteration.

3. The method of claim 1, wherein said transmission of said at least one document comprises storing said at least one document in a transportable electronic medium.

4. The method of claim 3, wherein said transportable electronic medium comprises an electronic mail message attachment.

5. The method of claim 1, wherein said purchase order response portion further includes an accept all control that when selected converts said dynamic fields to read-only fields and a submit changes control that when selected submits modifications made by said supplier and converts said dynamic fields to read-only fields.

6. The method of claim 1, wherein said common fields comprise a purchaser information field, a supplier information field, a general order information field, an item description field, a quantity field, a price field, and a delivery date field.

7. The method of claim 1, further comprising uploading purchaser specified contents of least one document and said contents of said supplier altered copy in said supplier system to use for future transactions.

8. The method of claim 1, wherein said at least one document is in a user-friendly format that looks the same when printed as when displayed on a user interface.

9. The method of claim 1, wherein said purchase order portion is generated using internal purchase requests and represents an aggregate of a company's needs from said supplier.

10. The method of claim 1, wherein said purchase order response portion includes supplier generated data fields.

11. The method of claim 10, wherein said supplier generated data fields include tracking data fields and a supplier order number field.

12. A purchaser's system for emulating an on-line purchase order environment comprising:
    a first processor; and
    a first memory coupled to said first processor, said first memory storing an on-line emulator executed by said first processor, said on-line emulator comprising:
        a purchase order, purchase order response and order confirmation generator to generate an electronic document having a purchase order, a separate purchase order response and an order confirmation, wherein said purchase order comprises a first plurality of fields, said purchase order response comprises a second plurality of fields and said order confirmation comprises a third plurality of fields, the first, second and third plurality of fields each representing a plurality of terms of sale, wherein the first plurality of fields comprises read only fields, the second plurality of fields comprises dynamic fields and the third plurality of fields comprises dynamic fields, wherein said dynamic fields comprise rules for comparing data input to permissible values for the terms of sale;
        a storing agent to store the electronic document comprising said purchase order, said purchase order response and said order confirmation in a transportable electronic medium;
        a transmitter to transmit the electronic document having the purchase order, purchase order response and order confirmation to a supplier system; and
        an uploader to integrate contents of a supplier altered copy of at least a portion of said electronic document in response to receiving said supplier altered copy, the supplier altered copy altered on a second processor part of the supplier system.

13. The arrangement of claim 12, further comprising:
    a second memory coupled to said second processor; and
    a purchase order response modifier to query said supplier for at least one selection to alter contents of a copy of said at least one document.

14. The arrangement of claim 13, further comprising:
    a network to couple said first processor to said second processor when said supplier connects to said network and to decouple said first processor and said second processor when said supplier disconnects from said network.

15. The arrangement of claim 13, wherein said purchase order response modifier receives said purchase order, said purchase order response and said order confirmation while said second processor is coupled to said first processor and generates said supplier altered copy while said second processor is not coupled to said first processor.

16. The arrangement claim 12, wherein said purchase order is generated using internal purchase requests and represents an aggregate of a company's needs from said supplier.

17. The method of claim 12, wherein said purchase order response includes supplier generated data fields.

18. A computer readable storage medium storing thereon program instructions that, when executed, cause an executing device to:
    generate, by software installed on a purchaser's system, an electronic document comprising a purchase order, a separate purchase order response and an order confirmation, the purchase order including a first plurality of fields having read-only values, the purchase order response including a second plurality of fields that are dynamic fields having editable values and the order confirmation including a third plurality of fields that are dynamic fields having editable values, wherein the first, second and third plurality of fields each represent a plurality of terms of sale, wherein said dynamic fields comprise rules for comparing data input to permissible values for the terms of sale send said electronic document from said purchaser's system to a supplier system; and responsive to receipt of a modified copy of said purchase order response portion from said supplier system, integrate contents of said modified copy with said software installed on said purchaser's system.

19. The computer readable storage medium of claim 18, wherein said purchase order response portion provides filtering to notify said supplier of errors during alteration.

20. The computer readable storage medium of claim 18, wherein said transmission of said at least one document comprises storing said at least one document in a transportable electronic medium.

21. The computer readable storage medium of claim 20, wherein said transportable electronic medium comprises an electronic mail message attachment.

22. The computer readable storage medium of claim 18, wherein said purchase order response portion further includes an accept all control that when selected converts said dynamic fields to read-only fields and a submit changes control that when selected submits modifications made by said supplier and converts dynamic fields to read-only fields.

23. The computer readable storage medium of claim 18, wherein said common fields comprise a purchaser information field, a supplier information field, a general order information field, an item description field, a quantity field, a price field, and a delivery date field.

24. The computer readable storage medium of claim 18, further comprising uploading purchaser specified contents of least one document and said contents of said supplier altered copy in said supplier system to use for future transactions.

25. The computer readable storage medium of claim 18, wherein said at least one document is in a user-friendly format that looks the same when printed as when displayed on a user interface.

26. The computer readable storage medium of claim 18, wherein said purchase order portion is generated using internal purchase requests and represents an aggregate of a company's needs from said supplier.

27. The computer readable storage medium of claim 18, wherein said purchase order response portion includes supplier generated data fields.

28. The computer readable storage medium of claim 27, wherein said supplier generated data fields including tracking data fields and a supplier order number field.

29. A computer-implemented method for managing business to business transactions, comprising:

generating, by software installed on a purchaser's system, an electronic purchase management document comprising a purchase order, a separate purchase order response and an order confirmation, the purchase order including a first plurality of fields, the purchase order response including a second plurality of fields and the order confirmation including a third plurality of fields, the first, second and third plurality of fields each representing a plurality of terms of sale, wherein the first plurality of fields of the purchase order become non-editable following generation of the purchase management document, and the second plurality of fields of the purchase order response are editable and include rules for comparing user input to the purchase order response fields to permissible values thereof and for rejecting user edits to the purchase order response fields in violation of the permissible values;

transmitting the purchase management document from a purchaser's computer system to a second computer system in a purchase order proposal message; and when a proposal response message is received, integrating contents of a modified purchase management document into the software installed on the purchaser's system.

30. The method of claim 1, wherein the supplier system is off-line.

31. The system of claim 12, wherein the supplier system is off-line.

* * * * *

UNITED STATES PATENT AND TRADEMARK OFFICE
CERTIFICATE OF CORRECTION

PATENT NO. : 7,577,587 B2 Page 1 of 1
APPLICATION NO. : 10/949110
DATED : August 18, 2009
INVENTOR(S) : Karen A. Gee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Seventh Day of September, 2010

David J. Kappos
*Director of the United States Patent and Trademark Office*